(12) United States Patent
Johnson (10) Patent No.: US 8,411,184 B2
(45) Date of Patent: Apr. 2, 2013

(54) COLUMN OUTPUT CIRCUITS FOR IMAGE SENSORS

(75) Inventor: Bruce V. Johnson, Pittsford, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 287 days.

(21) Appl. No.: 12/644,490

(22) Filed: Dec. 22, 2009

(65) Prior Publication Data

US 2011/0149136 A1  Jun. 23, 2011

(51) Int. Cl.
*H04N 5/335* (2011.01)
*H01L 27/146* (2006.01)

(52) U.S. Cl. .................. 348/308; 250/208.1

(58) Field of Classification Search ............ None
See application file for complete search history.

(56) References Cited

U.S. PATENT DOCUMENTS

| | | | |
|---|---|---|---|
| 7,154,548 B2 | 12/2006 | Liu | |
| 2004/0159771 A1* | 8/2004 | Yang et al. | 250/208.1 |
| 2005/0062866 A1* | 3/2005 | Ang | 348/302 |
| 2005/0243194 A1* | 11/2005 | Xu | 348/241 |
| 2007/0012870 A1 | 1/2007 | Pain et al. | |
| 2008/0169845 A1 | 7/2008 | Xu | |
| 2008/0204567 A1 | 8/2008 | Xu | |
| 2008/0211948 A1 | 9/2008 | Kikuchi et al. | |
| 2008/0239105 A1 | 10/2008 | Xu | |
| 2009/0073297 A1* | 3/2009 | Cho et al. | 348/308 |

FOREIGN PATENT DOCUMENTS

| | | |
|---|---|---|
| WO | WO-2007135158 | 11/2007 |
| WO | WO-2008088686 | 4/2008 |

OTHER PUBLICATIONS

International Preliminary Report on Patentability for Application No. PCT/US2010/059361 dated Jun. 26, 2012, 8 pages.
International Search Report and Written Opinion for Application No. PCT/US2010/059361 dated Feb. 25, 2011, 11 pages.

* cited by examiner

*Primary Examiner* — Luong T Nguyen
(74) *Attorney, Agent, or Firm* — Blakely, Sokoloff, Taylor & Zafman (57) ABSTRACT

A pixel array in an image sensor includes multiple pixels arranged in rows and columns with each column of pixels electrically connected to a column output line. A sample and hold circuit is electrically connected to each column output line. In one embodiment in accordance with the invention, each sample and hold circuit includes one capacitor for receiving and storing a signal voltage and a second capacitor for receiving and storing a reset voltage. The sample and hold circuits are divided into distinct groups, with each group including two or more sample and hold circuits. A pair of buffers is electrically connected to each distinct group. One global bus receives the signal voltages from at least a portion of buffers and another global bus receives the reset voltages from at least a portion of the other buffers. The global buses can include one or more signal lines.

10 Claims, 9 Drawing Sheets

COLUMN OUTPUT CIRCUITS FOR IMAGE SENSORS

TECHNICAL FIELD

The present invention relates generally to the field of image sensors, and more particularly to column output circuits in image sensors.

BACKGROUND

Figure 1:
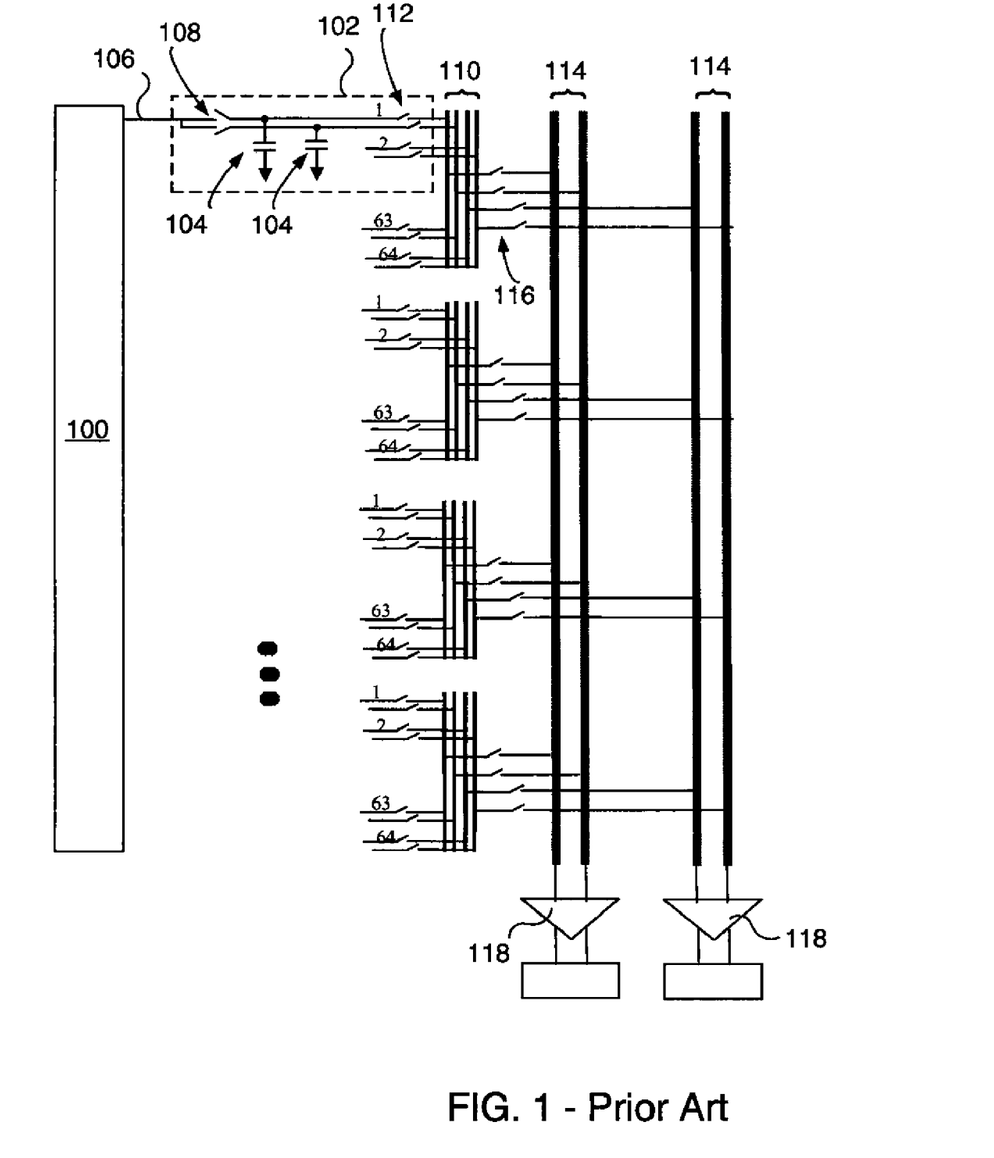
FIG. 1 is a schematic diagram of a first column output circuit in accordance with the prior art.

Image sensors, such as Complementary Metal Oxide Semiconductor image sensors, output image signals from an array of pixels to column output circuits. FIG. 1 is a schematic diagram of a first column output circuit in accordance with the prior art. Each column of pixels in a pixel array 100 is electrically connected to a sample and hold circuit 102. For simplicity, only one sample and hold circuit is shown in FIG. 1. Capacitors 104 are each electrically connected to column output line 106 via switches 108. Each capacitor 104 is electrically connected to a respective local bus 110 through one of the switches 112 and eventually to a respective global bus 114 via one of the switches 116. Amplifiers 118 are connected to global buses 114 and receive the signals stored on capacitors 104.

When the accumulated charges are read out of pixel array 100, the reset signals for one row of pixels are typically simultaneously stored on one capacitor 104 in sample and hold circuit 102 and the image signals stored on the other capacitor 104. Reading out the stored charges on capacitors 108 is performed serially. To read out charge from capacitors 108 connected to column line 106, local busses 110 and global busses 114 are first pre-charged to a reference voltage to prevent "memory" effects from charge read out of a previous column. Then the appropriate switches in switches 112 and 116 are closed, and the stored capacitor charge is redistributed between the capacitors 108 and the parasitic capacitance of the global buses 114. The parasitic capacitances produced by the relatively long global busses, however, reduce the gain of the recovered signal. To compensate for this reduced gain, a gain is applied to the charge read out of amplifiers 118. The applied gain increases the noise level along with the signal level, an undesirable result because the noise degrades the quality of the captured image.

Figure 2:
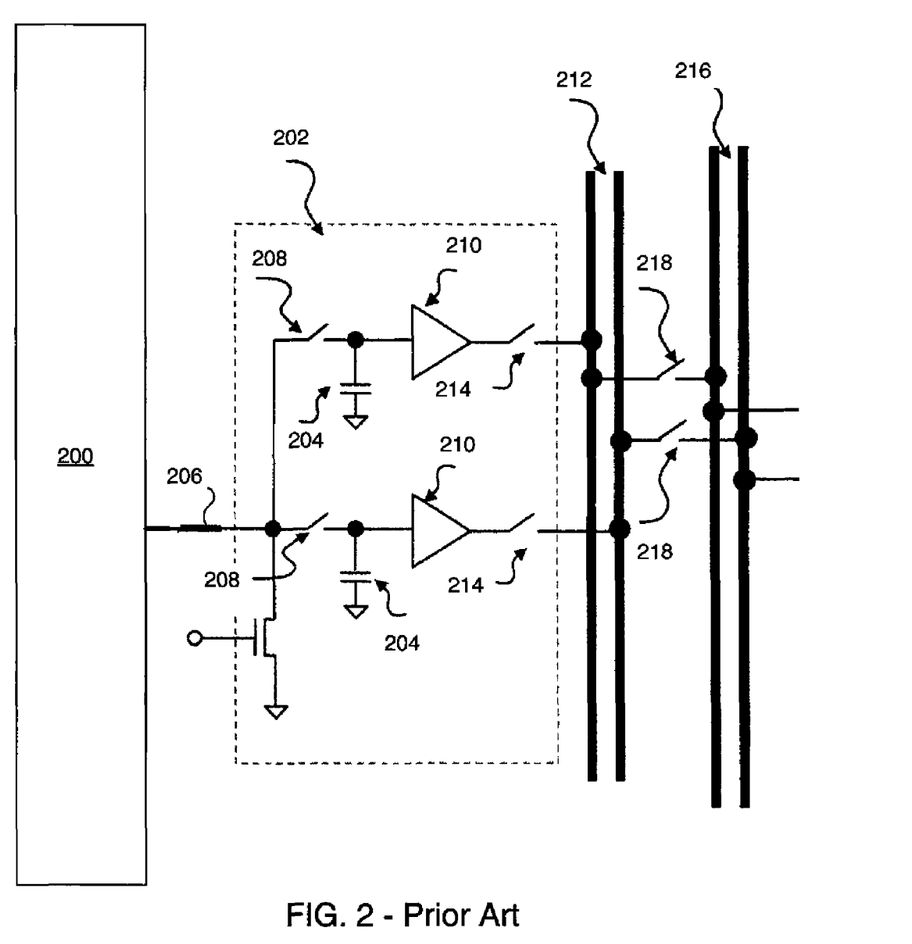
FIG. 2 is a schematic diagram of a second column output circuit in accordance with the prior art.

FIG. 2 is a schematic diagram of a second column output circuit in accordance with the prior art. Again, each column of pixels in a pixel array 200 is electrically connected to a sample and hold circuit 202. For simplicity, only one sample and hold circuit is shown in FIG. 2. Each sample and hold circuit 202 includes a pair of capacitors 204 each electrically connected to the pixel column bus 206 respectively via switches 208. Each capacitor 204 is electrically connected to a respective buffer amplifier 210 for storing the charge from capacitors 204 and for isolating the signal on the capacitors 204 from the local bus 212. The buffer amplifiers 210 are electrically connected to local bus 212 through switches 214 and eventually to the global bus 216 via switches 218.

The accumulated charges are read out of pixel array 200 using the same method described in conjunction with FIG. 1. The buffer amplifiers 210 in FIG. 2 are built at the same width as the width of a pixel column, which is typically very small. The very small size required for these buffers severely compromises their noise and speed performance, since it is well known that amplifier noise is inversely related to transistor size. The space required to instantiate 2*N buffers for an array of N pixels is another drawback to this approach.

SUMMARY

A pixel array in an image sensor includes multiple pixels arranged in rows and columns with each column of pixels electrically connected to a column output line. A sample and hold circuit is electrically connected to each column output line. In one embodiment in accordance with the invention, each sample and hold circuit includes one capacitor for receiving and storing a signal voltage and a second capacitor for receiving and storing a reset voltage.

The sample and hold circuits are divided into distinct groups, with each group including two or more sample and hold circuits. A pair of buffers is electrically connected to each distinct group. One global bus receives the signal voltages from at least a portion of buffers and another global bus receives the reset voltages from at least a portion of the other buffers. The global buses can include one or more signal lines.

The image sensor can be included in an image capture device.

BRIEF DESCRIPTION OF THE DRAWINGS

Embodiments of the invention are better understood with reference to the following drawings. The elements of the drawings are not necessarily to scale relative to each other.

DETAILED DESCRIPTION

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means either a direct electrical connection between the items connected, or an indirect connection through one or more passive or active intermediary devices. The term "circuit" means either a single component or a multiplicity of components, either active or passive, that are connected together to provide a desired function. The term "signal" means at least one current, voltage, or data signal.

Referring to the drawings, like numbers indicate like parts throughout the views.

Figure 3:
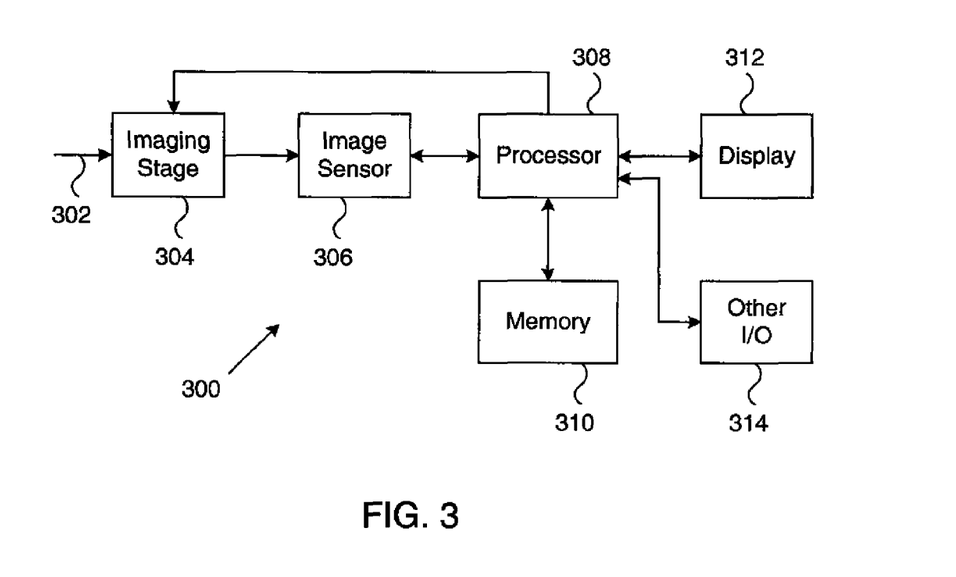
FIG. 3 is a simplified block diagram of an image capture device in an embodiment in accordance with the invention.

FIG. 3 is a simplified block diagram of an image capture device in an embodiment in accordance with the invention. Image capture device 300 is implemented as a digital camera in FIG. 3. Those skilled in the art will recognize that a digital camera is only one example of an image capture device that can utilize an image sensor incorporating the present invention. Other types of image capture devices, such as, for example, cell phone cameras, scanners, and digital video camcorders, can be used with the present invention.

In digital camera 300, light 302 from a subject scene is input to an imaging stage 304. Imaging stage 304 can include conventional elements such as a lens, a neutral density filter, an iris and a shutter. Light 302 is focused by imaging stage 304 to form an image on image sensor 306. Image sensor 306 captures one or more images by converting the incident light into electrical signals. Digital camera 300 further includes processor 308, memory 310, display 312, and one or more additional input/output (I/O) elements 314. Although shown as separate elements in the embodiment of FIG. 3, imaging stage 304 may be integrated with image sensor 306, and possibly one or more additional elements of digital camera 300, to form a camera module. For example, a processor or a memory may be integrated with image sensor 306 in a camera module in embodiments in accordance with the invention.

Processor 308 may be implemented, for example, as a microprocessor, a central processing unit (CPU), an application-specific integrated circuit (ASIC), a digital signal processor (DSP), or other processing device, or combinations of multiple such devices. Various elements of imaging stage 304 and image sensor 306 may be controlled by timing signals or other signals supplied from processor 308.

Memory 310 may be configured as any type of memory, such as, for example, random access memory (RAM), read-only memory (ROM), Flash memory, disk-based memory, removable memory, or other types of storage elements, in any combination. A given image captured by image sensor 306 may be stored by processor 308 in memory 310 and presented on display 312. Display 312 is typically an active matrix color liquid crystal display (LCD), although other types of displays may be used. The additional I/O elements 314 may include, for example, various on-screen controls, buttons or other user interfaces, network interfaces, or memory card interfaces.

It is to be appreciated that the digital camera shown in FIG. 3 may comprise additional or alternative elements of a type known to those skilled in the art. Elements not specifically shown or described herein may be selected from those known in the art. As noted previously, the present invention may be implemented in a wide variety of image capture devices. Also, certain aspects of the embodiments described herein may be implemented at least in part in the form of software executed by one or more processing elements of an image capture device. Such software can be implemented in a straightforward manner given the teachings provided herein, as will be appreciated by those skilled in the art.

Figure 4:
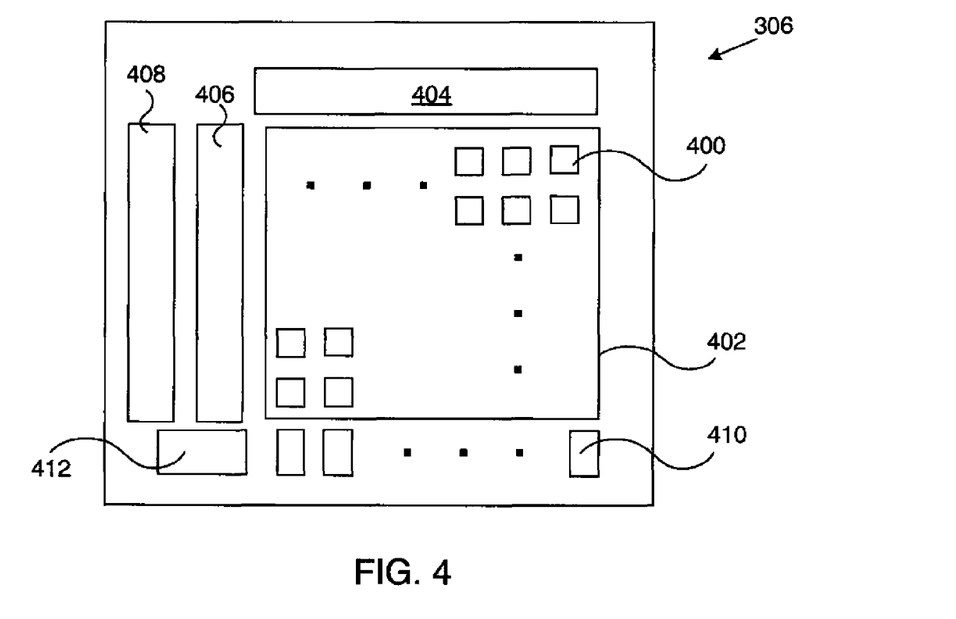
FIG. 4 is a block diagram of a top view of an image sensor in an embodiment in accordance with the invention.

Referring now to FIG. 4, there is shown a block diagram of a top view of an image sensor in an embodiment in accordance with the invention. Image sensor 306 includes a number of pixels 400 typically arranged in rows and columns that form a pixel array 402. Image sensor 306 further includes column decoder 404, row decoder 406, digital logic 408, multiple analog or digital output circuits 410, and timing generator 412. Each column of pixels 400 in pixel array 402 is electrically connected to an output circuit 410. Timing generator 412 generates the signals needed to read out signals from pixel array 402. Portions of the output circuit can be shared between two or more columns of pixels, as will be described later in conjunction with FIGS. 6-8.

Image sensor 306 is implemented as an x-y addressable image sensor, such as, for example, a Complementary Metal Oxide Semiconductor (CMOS) image sensor, in an embodiment in accordance with the invention. Thus, column decoder 404, row decoder 406, digital logic 408, analog or digital output channels 410, and timing generator 412 are implemented as standard CMOS electronic circuits that are operatively connected to pixel array 400.

Functionality associated with the sampling and readout of pixel array 402 and the processing of corresponding image data may be implemented at least in part in the form of software that is stored in memory 310 (see FIG. 3) and executed by processor 308. Portions of the sampling and readout circuitry may be arranged external to image sensor 306, or formed integrally with pixel array 402, for example, on a common integrated circuit with photodetectors and other elements of the pixel array. Those skilled in the art will recognize that other peripheral circuitry configurations or architectures can be implemented in other embodiments in accordance with the invention.

Figure 5:
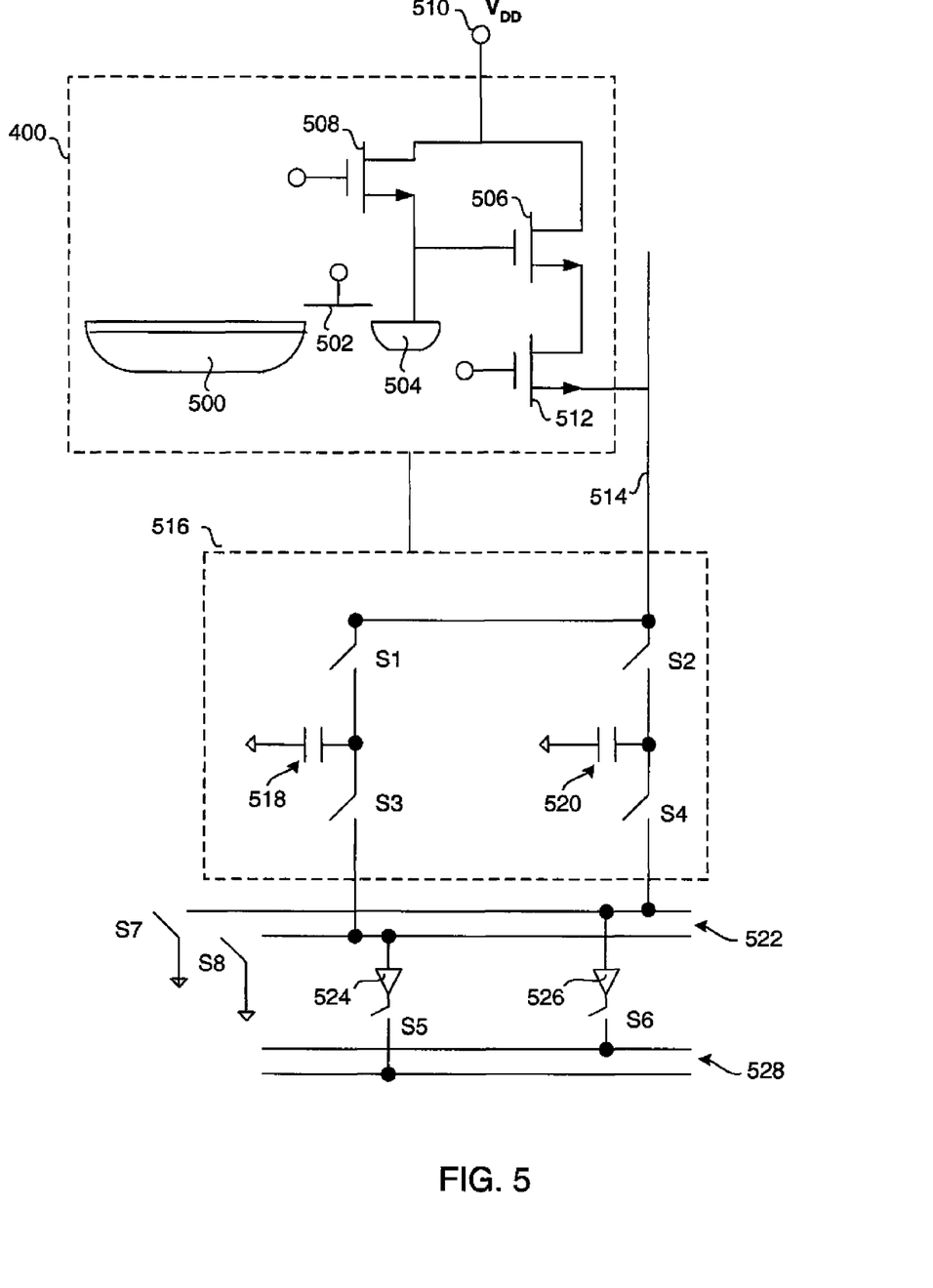
FIG. 5 is a schematic diagram of a pixel and first column output circuit suitable for use in image sensor 306 in an embodiment in accordance with the invention.

FIG. 5 is a schematic diagram of a pixel and column output circuit suitable for use in image sensor 306 in an embodiment in accordance with the invention. Pixel 400 includes photodetector 500, transfer gate 502, charge-to-voltage conversion mechanism 504, amplifier 506, reset transistor 508, potential $V_{DD}$ 510, and row select transistor 512. One source/drain of row select transistor 512 is connected to a source/drain of amplifier 506 and the other source/drain of reset transistor 512 is connected to column output line 514. One source/drain of reset transistor 508 and one source/drain of amplifier 506 are maintained at potential $V_{DD}$ 510. The other source/drain of reset transistor 508 and the gate of amplifier 506 are connected to charge-to-voltage conversion mechanism 504.

Photodetector 500 collects charge carriers in response to light striking pixel array 402 (FIG. 4). Transfer gate 502 is used to transfer the accumulated charge carriers from photodetector 500 to charge-to-voltage conversion mechanism 504. Charge-to-voltage conversion mechanism 504 converts the charge into a voltage signal. Charge-to-voltage conversion mechanism 306 is configured as a floating diffusion in an embodiment in accordance with the invention.

Amplifier 506 amplifies the voltage in charge-to-voltage conversion mechanism 504. Amplifier 506 is implemented as a source follower transistor in an embodiment in accordance with the invention. Reset transistor 508 is used to reset charge-to-voltage conversion mechanism 504 to potential $V_{DD}$ 510 prior to pixel readout. Row select transistor 512 is used to select a row of pixels in pixel array 402. When row select transistor 512 is active, the voltage on amplifier 506 is transferred to column output line 514 and transmitted to sample and hold circuit 516.

When the charge-to-voltage conversion mechanism 504 is reset to a known potential, switch S1 is closed, a reset voltage read from charge-to-voltage conversion mechanism 504, and the reset voltage stored on capacitor 518. Thereafter, the charge accumulated by photodetector 500 is transferred to charge-to-voltage conversion region 504. Switch S1 is opened, switch S2 closed, and a signal voltage is read from charge-to-voltage conversion region 504. The signal voltage is stored on capacitor 520. Switch S2 is then opened to electrically isolate sample and hold circuit 516 from pixel 400. This readout process typically occurs simultaneously for all pixels in one row of pixels in pixel array 402 (FIG. 4).

The voltages are then available to be read out of sample and hold circuit 516 one sample and hold circuit at a time (i.e., a serial readout). Prior to readout of a given column, switches S7 and S8 are closed then opened to pre-charge the small local bus parasitic capacitance to a reference voltage to prevent "memory" effects from the previous column read out. Switches S3 and S4 are then closed and the voltages stored on capacitors 518, 520 are transferred to local bus 522. In the FIG. 5 embodiment, local bus 522 includes two signal lines with switch S3 electrically connected to one signal line and switch S4 electrically connected to the other signal line. Thus, the signal line connected to switch S3 receives the signal voltage while the signal line connected to switch S4 receives the reset voltage.

Buffer amplifiers 524, 526 are each connected to one of the signal lines in local bus 522. Buffer amplifier 524 receives the voltage from capacitor 518 and buffer amplifier 526 the voltage from capacitor 520. Buffer amplifiers 524, 526 pass the voltages onto global bus 528 via switches S5, S6. In the FIG. 5 embodiment, global bus 528 includes two signal lines with buffer amplifier 524 electrically connected to one signal line and buffer amplifier 526 electrically connected to the other signal line. Buffer amplifiers 524, 526 are implemented as unity gain amplifiers in an embodiment in accordance with the invention.

Timing generator 412 (FIG. 4) can generate the signals for selecting pixels 400 in the pixel array 402, for transferring charge from the photodetector 500 to the charge-to-voltage conversion region 504, for resetting pixels, and for opening and closing switches S1-S8 in an embodiment in accordance with the invention. In other embodiments in accordance with the invention, some or all of these signals can be generated in an image capture device and transmitted to image sensor 306. By way of example only, processor 308 in FIG. 3 can be used to provide some or all of these signals to image sensor 306.

Although FIG. 5 depicts only one pixel 400 and sample and hold circuit 516, those skilled in the art will recognize multiple pixels (e.g., a column of pixels) are connected to column output line 514, and a typical image sensor includes a sample and hold circuit for each column output line 514. Additionally, pixel 400 can be implemented differently in other embodiments in accordance with the invention. By way of example only, pixel 400 can be configured as a three transistor (3 T) pixel or utilize a shared pixel architecture.

Figure 6:
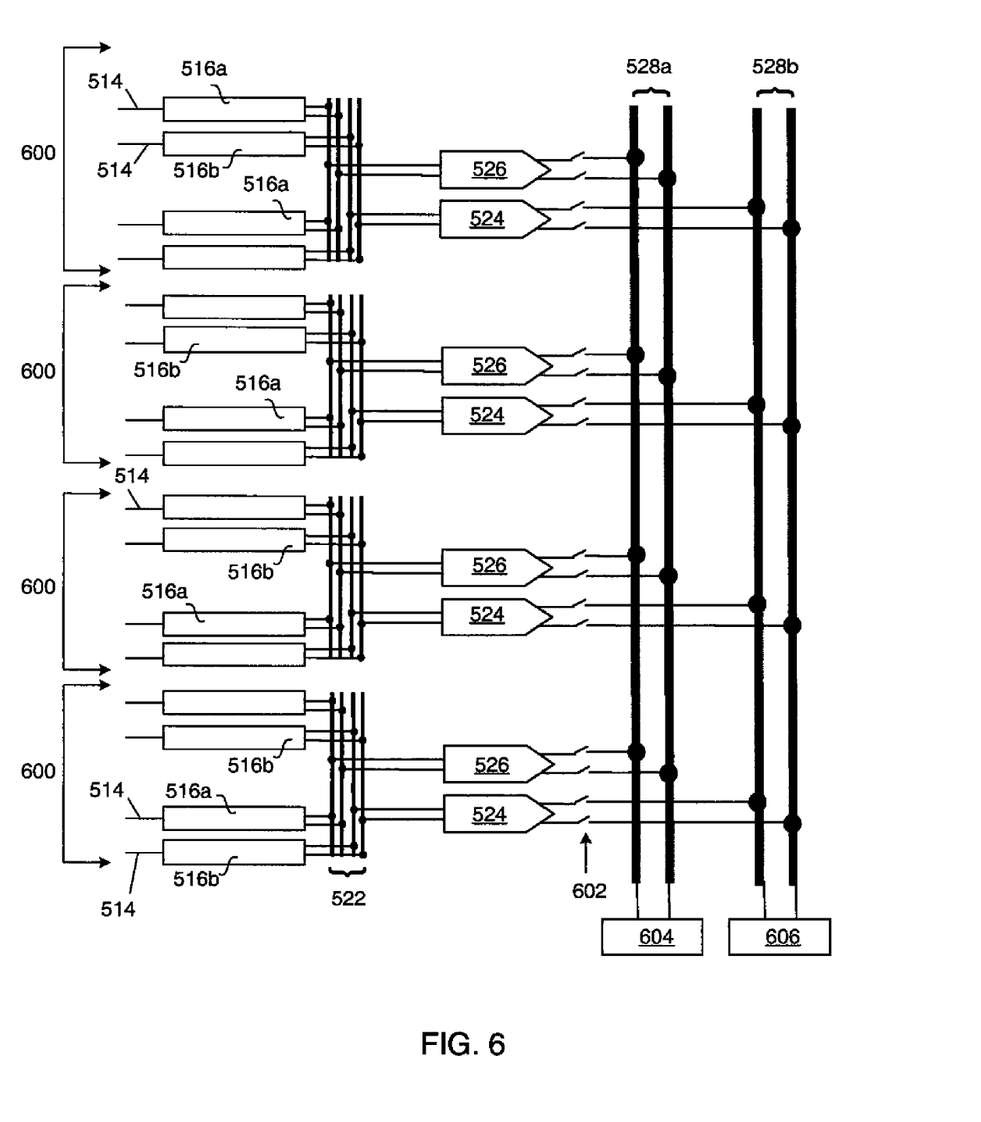
FIG. 6 is a schematic diagram of multiple column output circuits in an embodiment in accordance with the invention.

Referring now to FIG. 6, there is shown a schematic diagram of an arrangement of multiple column output circuits 412 in an embodiment in accordance with the invention. Column output lines 514 from a pixel array (not shown in FIG. 6) are connected to sample and hold circuits 516a, 516b. Each sample and hold circuit includes switches S1, S2, S3, S4 and capacitors 518, 520 configured as shown in FIG. 5.

In the embodiment shown in FIG. 6, local bus 522 includes four signal lines, with buffer amplifiers 524, 526 electrically connected to respective signal lines in local bus 522. Each output of the sample and hold circuits 516a, 516b is electrically connected to a respective one of the signal lines. Thus, one of the two signal lines connected to buffer amplifier 524 receives the signal voltages while the other signal line connected to buffer amplifier 524 receives the reset voltages from the sample and hold circuits connected to buffer amplifier 524. Similarly, one of the two signal lines connected to buffer amplifier 526 receives the signal voltages while the other signal Line connected to buffer amplifier 526 receives the reset voltages from the sample and hold circuits connected to buffer amplifier 526.

Sample and hold circuits 516a, 516b are divided into groups 600. In the embodiment shown in FIG. 6, the sample and hold circuits 516a in each group 600 are electrically connected to buffer amplifier 526 while sample and hold circuits 516b are electrically connected to buffer amplifier 524.

Global buses 528a, 528b each include two signal lines. The outputs of each sample and hold circuit 516a, 516b are connected to respective signal lines in global buses 528a, 528b via switches 602. In the embodiment shown in FIG. 6, the outputs of buffer amplifiers 526 are electrically connected to the signal lines in global bus 528a while the outputs of buffer amplifiers 524 are electrically connected to the signal lines in global bus 528b.

Differential amplifiers 604, 606 are electrically connected to global buses 528a, 528b, respectively. Each differential amplifier 604, 606 computes a difference signal between the signal voltage and reset voltage from a sample and hold circuit in an embodiment in accordance with the invention. Differential amplifiers 604, 606 can be implemented with any type of differential amplifier. One exemplary differential amplifier that can be used in an embodiment in accordance with the invention is a programmable gain amplifier.

The column output circuit of FIG. 5 is less noisy and more space efficient than the prior art column output circuits, such as the column circuits illustrated in FIG. 2. Only one buffer amplifier 524, 526 is required for M column circuits, where M is an integer greater than one. By way of example only, M equals sixty-four in an embodiment in accordance with the invention. M can equal a different value in other embodiments in accordance with the invention.

The column output circuit of FIG. 5 is less noisy than the FIG. 2 prior art column circuit because fewer buffer amplifiers are required, thereby allowing the buffer amplifiers to be larger and have superior noise performance. The column output circuit of FIG. 5 is less noisy than the prior art column circuit of FIG. 1 because the local buffers 524 and 526 isolate the relatively large parasitic capacitance of the global busses 528 from the local busses 528. As previously discussed, the gain of the recovered signal is attenuated by the parasitic capacitances of the global busses in the prior art column circuit of FIG. 1. Gain must be applied to compensate for this attenuation, which increases noise in the recovered signal.

Figure 7:
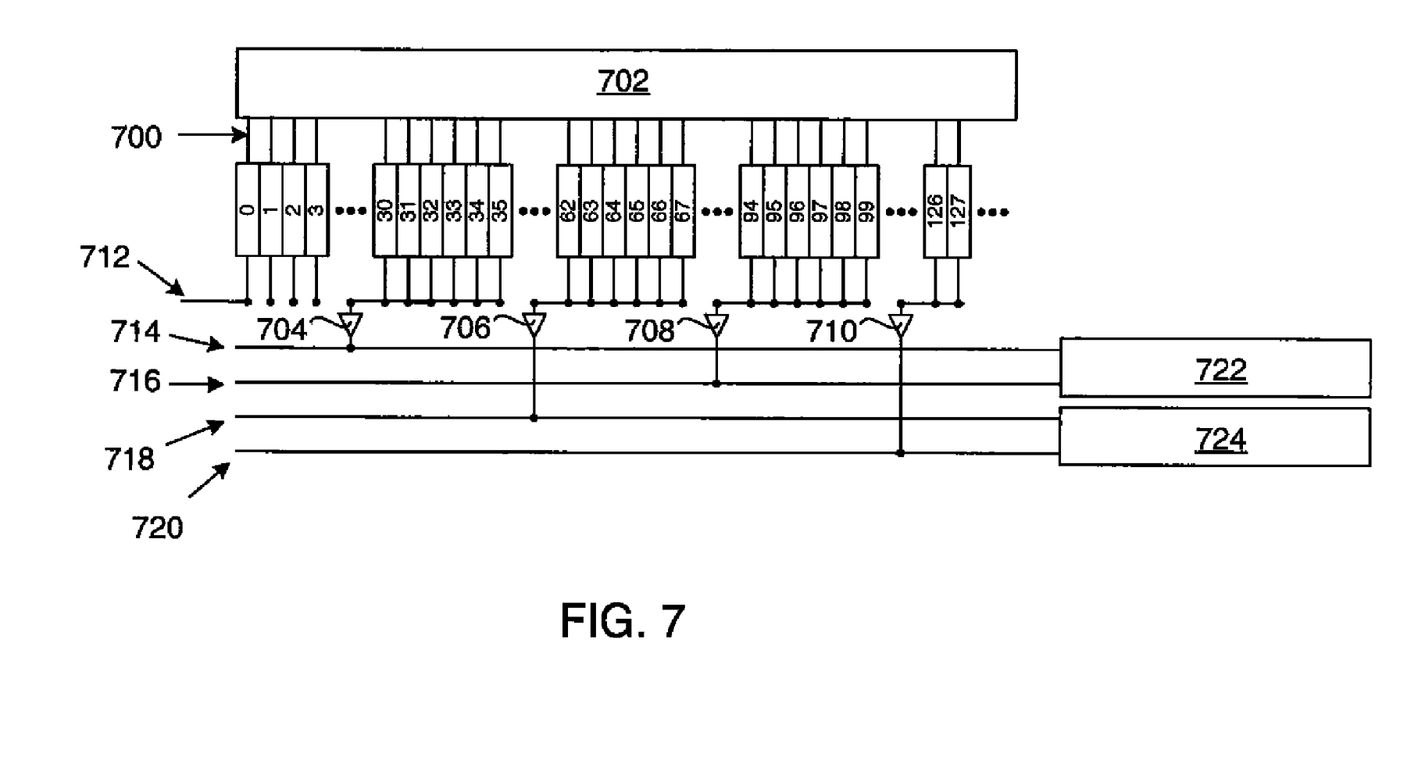
FIG. 7 is a schematic diagram of a second column output circuit suitable for use in image sensor 306 in an embodiment in accordance with the invention.

FIG. 7 is a schematic diagram of a second column output circuit suitable for use in image sensor 306 in an embodiment in accordance with the invention. Column output lines 700 from pixel array 702 are connected to sample and hold circuits 1, 2, 3, . . . , 126, 127, . . . , n. Each sample and hold circuit is configured like sample and hold circuit 516 shown in FIG. 5 in an embodiment in accordance with the invention.

In the embodiment shown in FIG. 7, an input of buffer amplifiers 704, 706, 708, 710, is electrically connected to local bus 712. Local bus 712 is depicted as single-ended for simplicity. Global buses 714, 716, 718, 720 are electrically connected to an output of buffer amplifiers 704, 706, 708, 710, respectively. Global buses 714, 716, 718, 720 are also depicted as single-ended for simplicity. Global buses 714, 716 are electrically connected to analog-to-digital channel 722 while global buses 718, 720 are electrically connected to analog-to-digital channel 724. Analog-to-digital channels 722, 724 receive the analog voltage signals on global buses 714, 716, 718, 720 and convert the signals to digital signals.

Figure 8:
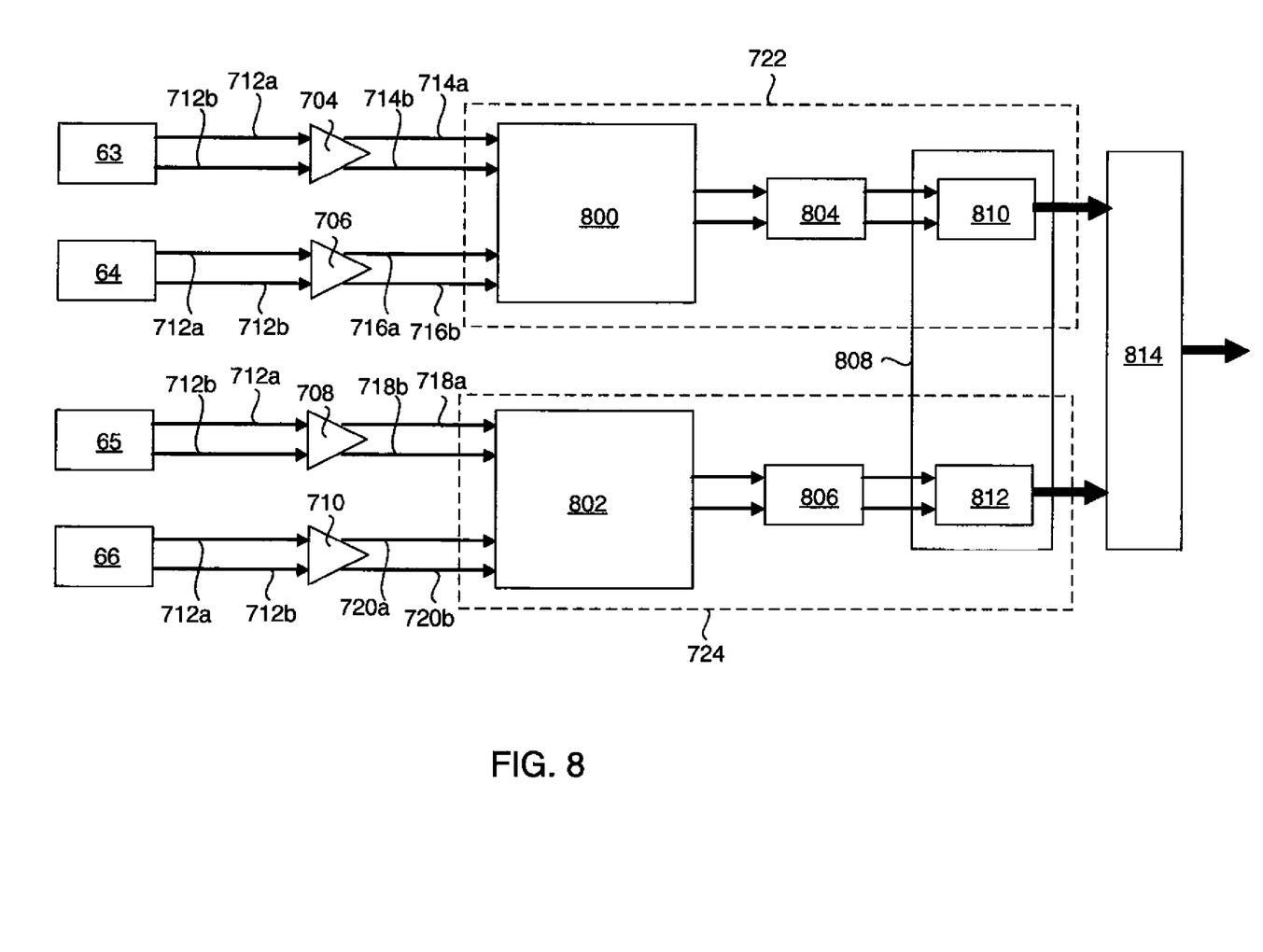
FIG. 8 is a more detailed schematic diagram of second column output in an embodiment in accordance with the invention.

FIG. 8 is a more detailed schematic diagram of second column output circuit in an embodiment in accordance with the invention. Representative sample and hold circuits 63, 64, 65, 66 are each connected to a column output line (not shown in FIG. 8) and local buses 712a, 712b. Each sample and hold circuit is configured like sample and hold circuit 516 shown in FIG. 5 in an embodiment in accordance with the invention.

Sample and hold circuits 63, 64, 65, 66 are electrically connected buffer amplifiers 704, 706, 708, 710, respectively. The outputs of buffer amplifier 704 are electrically connected to differential amplifier 800 via global bus 714a, 714b while the outputs of buffer amplifier 706 are electrically connected to differential amplifier 800 via global bus 716a, 716b. The outputs of buffer amplifier 708 are electrically connected to differential amplifier 802 via global bus 718a, 718b while the outputs of buffer amplifier 710 are electrically connected to differential amplifier 802 via global bus 720a, 720b. Differential amplifiers 800, 802 receive a reset voltage and a signal voltage from each sample and hold circuit and subtract the reset voltage from the signal voltage in the embodiment shown in FIG. 8. Differential amplifiers 800, 802 are configured as programmable gain amplifiers with dual sampling capacitors in an embodiment in accordance with the invention.

The outputs of differential amplifiers 800, 802 are electrically connected to amplifiers 804, 806, respectively. Amplifiers 804, 806 are configured as programmable gain amplifiers in an embodiment in accordance with the invention. The outputs of amplifiers 804, 806 are electrically connected to analog-to-digital converter (ADC) 808. ADC 808 is implemented with two channels 810, 812 and a single clock phase in an embodiment in accordance with the invention. And finally, the outputs of ADC 808 are electrically connected to selector circuit 814. Selector circuit 814 is configured as a digital multiplexer in an embodiment in accordance with the invention.

The use of two analog-to-digital channels 722, 724 and selector circuit 814 provides parallelism in the serial readout phase (parallel to serial conversion), thereby increasing the readout speed for the image sensor. In one embodiment in accordance with the invention, two analog-to-digital channels 722, 724 and one selector circuit 814 are positioned at the top and at the bottom of a pixel array. Thus, each analog-to-digital channel receives the voltage signals from one fourth of the pixels in the pixel array. Other embodiments in accordance with the invention can use any number of differential amplifiers, amplifiers, or selector circuits to receive signals from a pixel array.

Figure 9:
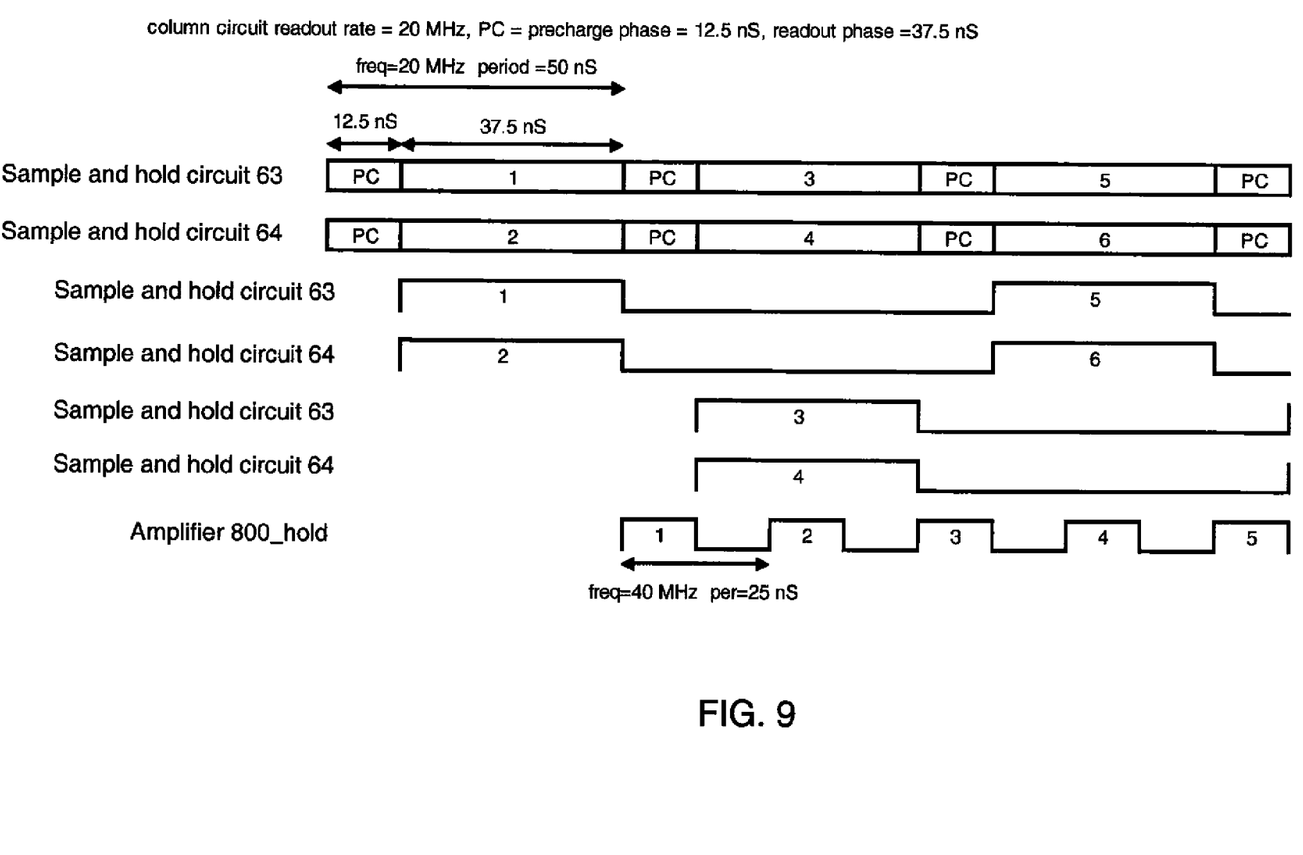
FIG. 9 illustrates an exemplary timing diagram for amplifier 800 in FIG. 8.

The embodiments shown in FIGS. 7 and 8 can use a relatively short pre-charge phase (PC) and a longer readout phase. In this case, each amplifier 800, 802 has more time available to settle in the readout phase, so the bandwidth required for each amplifier is reduced. This allows the power consumption and noise to be reduced. FIG. 9 illustrates an exemplary timing diagram for amplifier 800. Relative to a 40 MHz 50% duty cycle single channel amplifier, the available sample and hold circuit setting time is tripled in the FIG. 9 embodiment. This produces a two-thirds decrease of bandwidth required for amplifier 800. It is well known that the supply current required for an amplifier scales with the square of bandwidth required. Therefore the amplifier operating at ⅓ bandwidth in this embodiment requires ⅑ the current compared to an amplifier operating at the prior art full bandwidth. Therefore, the total current for the dual channel differential amplifiers 800, 802 is ⅖, or 22%, of the current required for a prior art 40 MHz 50% duty cycle single channel amplifier.

Figure 10:
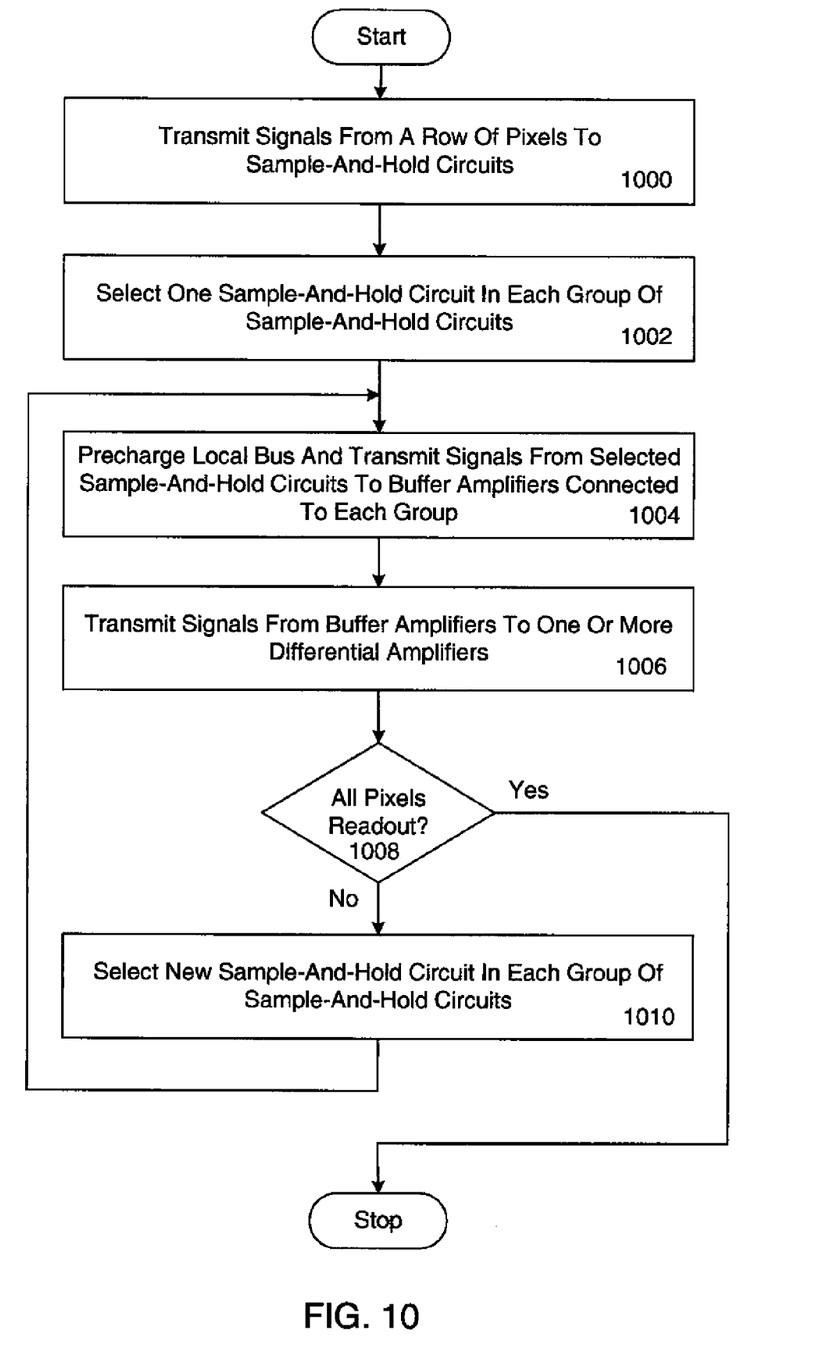
FIG. 10 is a flowchart depicting a method for reading out signals from a pixel array in an embodiment in accordance with the invention.

Referring now to FIG. 10, there is shown a flowchart depicting a method for reading out signals from a pixel array in an embodiment in accordance with the invention. A sample-and-hold circuit is electrically connected to each column output line of the pixel array in an embodiment in accordance with the invention. The sample-and-hold circuits are divided into M groups, with each group including two or more sample-and-hold circuits. M is an integer greater than one.

Initially, the voltage or image signals from one row of pixels in the pixel array are transmitted to the sample-and-hold circuits, as shown in block 1000. The sample-and-hold circuits are configured as sample-and-hold-circuits 516 shown in FIG. 5 in an embodiment in accordance with the invention.

Next, one sample-and-hold circuit in each group of sample-and-hold circuits is selected at block 1002. The local buses are pre-charged and the signals transmitted from the selected sample-and-hold circuits to the buffer amplifier connected to each group of sample-and-hold circuits (block 1004). The signals are transmitted from the sample-and-hold circuits to one or more differential amplifiers connected to the sample-and-hold circuits (block 1006). The signals can be transmitted to the buffer amplifiers either serially or in parallel, with some or all of the signals transmitted simultaneously when transmitted in parallel. FIGS. 7 and 8 illustrate an output structure than can be used to transmit signals from the buffer amplifiers in parallel.

A determination is then made at block 1008 as to whether or not the signals from all the pixels, or all of the desired pixels, have been read out. If not, the process passes to block 1010 where a new sample-and-hold circuit is selected in each group. The method then returns to block 1004 and repeats until all of the desired signals are read out of the pixel array.

The invention has been described in detail with particular reference to certain preferred embodiments thereof, but it will be understood that variations and modifications can be effected within the spirit and scope of the invention. For example, Pixels in other embodiments in accordance with the invention may be implemented differently from pixel 300. By way of example only, a pixel may omit one or more elements, such as charge-to-voltage conversion mechanism 306, in other embodiment in accordance with the invention.

Additionally, even though specific embodiments of the invention have been described herein, it should be noted that the application is not limited to these embodiments. In particular, any features described with respect to one embodiment may also be used in other embodiments, where compatible. And the features of the different embodiments may be exchanged, where compatible.

PARTS LIST 0, 1, 2, 3 sample and hold circuits
30, 31, 32, 33, 34, 35 sample and hold circuits
62, 63, 64, 65, 66, 67 sample and hold circuits
94, 95, 96, 97, 98, 99 sample and hold circuits
100 pixel array
102 sample and hold circuit
104 capacitor
106 column output line
108 switches
110 local buses
112 switches
114 global buses
116 switches
118 amplifier
126, 127 sample and hold circuits
200 pixel array
202 sample and hold circuit
204 capacitor
206 column output line
208 switches
210 amplifier
212 local buses
214 switches 216 global buses
218 switches
300 image capture device
302 light
304 imaging stage
306 image sensor
308 processor
310 memory
312 display
314 additional input/output (I/O) elements
400 pixel
402 pixel array
404 column decoder
406 row decoder
408 digital logic
410 multiple analog or digital output circuits
412 timing generator
500 photodetector
502 transfer gate
504 charge-to-voltage conversion mechanism
506 amplifier
508 reset transistor
510 potential $V_{DD}$
512 row select transistor
514 column output line
516 sample and hold circuit
518 capacitor
520 capacitor
522 local buses
524 buffer amplifier
526 buffer amplifier
528 global buses
600 group of sample and hold circuits
602 switches
604 differential amplifier
606 differential amplifier
700 column output lines
702 pixel array
704 buffer amplifier
706 buffer amplifier
708 buffer amplifier
710 buffer amplifier
712 local bus
714 global bus
716 global bus
718 global bus
720 global bus
722 analog-to-digital channel
724 analog-to-digital channel
800 differential amplifier
802 differential amplifier
804 amplifier
806 amplifier
808 analog-to-digital converter
810 channel
812 channel
814 selector circuit

The invention claimed is:

1. An image sensor comprising;
a pixel array including a plurality of pixels arranged in rows and columns, wherein the pixels in each column are electrically connected to a column output line;
a plurality of sample and hold circuits each electrically connected to a respective column output line, wherein each sample and hold circuit includes a first capacitor to receive a signal voltage and a second capacitor to receive a reset voltage, and further wherein each sample and hold circuit is electrically connected with the respective column output line and is electrically connected with a first local bus and a second local bus;
a plurality of pairs of buffers with each pair of buffers electrically connected to a distinct group of two or more sample and hold circuits, wherein a first buffer of each of the plurality of pairs of buffers is electrically connected with the first local bus and is electrically connected with a first global bus, and further wherein a second buffer of each of the plurality of pairs of buffers is electrically connected with the second local bus and is electrically connected with a second global bus;
wherein the first global bus to receive the signal voltages from at least a portion of buffers;
wherein the second global bus to receive the reset signals from at least a portion of the other buffers; and further comprising
at least one differential amplifier electrically connected to the first and second global buses to receive the signal voltage and the reset voltage and for determining a difference between the signal voltage and the reset voltage, wherein the first and second global buses each comprise two signal lines.

2. The image sensor as in claim 1, wherein the at least one differential amplifier is connected to the four signal lines in the first and second global buses and is configured to provide a parallel to serial conversion.

3. The image sensor as in claim 1, further comprising a third global bus to receive the image signals from at least a portion of one buffer in the plurality of pairs of buffers and a fourth global bus to receive the reset signals from at least a portion of the other buffers in the plurality of pairs of buffers.

4. An image capture device, comprising:
an image sensor, including:
a pixel array including a plurality of pixels arranged in rows and columns, wherein the pixels in each column are electrically connected to a column output line;
a plurality of sample and hold circuits each electrically connected to a respective column output line, wherein each sample and hold circuit includes a first capacitor to receive a signal voltage and a second capacitor to receive a reset voltage, and further wherein each sample and hold circuit is electrically connected with the respective column output line and is electrically connected with a first local bus and a second local bus;
a plurality of pairs of buffers with each pair of buffers electrically connected to a distinct group of two or more sample and hold circuits, wherein a first buffer of each of the plurality of pairs of buffers is electrically connected with the first local bus and is electrically connected with a first global bus, and further wherein a second buffer of each of the plurality of pairs of buffers is electrically connected with the second local bus and is electrically connected with a second global bus;
wherein the first global bus to receive the signal voltages from at least a portion of buffers;
wherein the second global bus to receive the reset signals from at least a portion of the other buffers; and further comprising
at least one differential amplifier electrically connected to the first and second global buses to receive the signal voltage and the reset voltage and for determining a difference between the signal voltage and the reset voltage, wherein the first and second global buses each comprise two signal lines.

5. The image sensor as in claim 4, wherein the at least one differential amplifier is connected to the four signal lines in the first and second global buses and is configured to provide a parallel to serial conversion.

6. The image sensor as in claim 4, further comprising a third global bus to receive the image signals from at least a portion of one buffer in the plurality of pairs of buffers and a fourth global bus to receive the reset signals from at least a portion of the other buffers in the plurality of pairs of buffers.

7. A method for reading out signals from a pixel array in an image sensor, wherein the pixels in each column of the pixel array are electrically connected to a column output line, the method comprising:

transmitting signals from a portion of pixels in the pixel array to a plurality of sample and hold circuits each electrically connected to a respective column output line, wherein each sample and hold circuit includes a first capacitor to receive a signal voltage and a second capacitor to receive a reset voltage, and further wherein each sample and hold circuit is electrically connected with the respective column output line and is electrically connected with a first local bus and a second local bus;

transmitting signals from selected sample-and-hold circuits to a plurality of pairs of buffers with each pair of buffers electrically connected to a distinct group of two or more sample and hold circuits, wherein a first buffer of each of the plurality of pairs of buffers is electrically connected with the first local bus and is electrically connected with a first global bus, and further wherein a second buffer of each of the plurality of pairs of buffers is electrically connected with the second local bus and is electrically connected with a second global bus;

receiving the signal voltages from at least a portion of buffers at the first global bus;

receiving the reset signals from at least a portion of the other buffers at the second global bus;

determining whether the signals from a desired number of pixels have been transmitted to one or more differential amplifiers; and if all of the signals have not been transmitted to the one or more differential amplifiers, then repeatedly selecting one sample-and-hold circuit in each of the distinct groups of two or more sample and hold circuits, transmitting signals from the selected sample-and-hold circuits to a buffer amplifier electrically connected to each of the distinct groups of two or more sample and hold circuits, and transmitting the signals from the buffer amplifiers to the one or more differential amplifiers until all of the pixels have been transmitted to the one or more differential amplifiers.

8. The method of claim 7, wherein the first and second global buses each comprise two signal lines.

9. The method of claim 8, wherein the at least one differential amplifier is connected to the four signal lines in the first and second global buses and is configured to provide a parallel to serial conversion.

10. The method of claim 9, further comprising:

receiving the image signals from at least a portion of one buffer in the plurality of pairs of buffers at a third global bus; and receiving the reset signals from at least a portion of the other buffers in the plurality of pairs of buffers at a fourth global bus.

* * * * *